United States Patent
DeLorme et al.

(10) Patent No.: US 6,785,693 B2
(45) Date of Patent: Aug. 31, 2004

(54) MANAGEMENT OF MULTIPLE LINKS TO A FILE IN A FILE SYSTEM

(75) Inventors: Dennis Steven DeLorme, Rochester, MN (US); Alan Leon Levering, Rochester, MN (US); Jeffrey John Parker, Rochester, MN (US); John Christopher Ripstra, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 09/776,549

(22) Filed: Feb. 2, 2001

(65) Prior Publication Data

US 2002/0107874 A1 Aug. 8, 2002

(51) Int. Cl.[7] ............................................. G06F 17/30
(52) U.S. Cl. .............................. 707/200; 707/3; 707/8; 707/10; 707/101; 709/204; 709/237
(58) Field of Search ........................... 707/10, 103, 201, 707/1, 3, 8, 103 R, 104.1, 200, 203, 204, 6, 101, 102, 206; 709/100, 107, 201, 223, 106, 103, 105, 220, 222, 227, 202, 204, 205, 207, 208, 226, 236, 237; 711/144, 119, 147, 171

(56) References Cited

U.S. PATENT DOCUMENTS

| 5,187,786 A | | 2/1993 | Densmore et al. .......... 395/600 |
| 6,047,289 A | * | 4/2000 | Thorne et al. ................ 707/10 |
| 6,098,072 A | | 8/2000 | Sluiman et al. ............. 707/103 |
| 6,591,278 B1 | * | 7/2003 | Ernst ....................... 707/104.1 |

* cited by examiner

Primary Examiner—Shahid Alam
Assistant Examiner—Fred Ehichioya
(74) Attorney, Agent, or Firm—Karuna Ojanen

(57) ABSTRACT

Multiple links to the same object are managed by storing the attributes of the object in only one place. Each directory which links to the object has an object attribute table; each table has a number of entries all capable of storing the attributes of the files linked to the directory. One of the entries in a directory linked to a file stores the attributes of that file, called the master entry; other entries in the same or other directories that also link to the same file have slave entries capable of storing the attributes but not storing the attributes in their respective object attribute table. The file need only address the master entry. The master entry may point to the other slave entries which may point back to the master or to other slave entries as determined by a pointer protocol. When the master entry is to be deallocated, another of the qualified slave entries receives the attribute information and the file is updated to reflect that a new master has been declared. According to the pointer protocol, other slave entries may also be updated.

11 Claims, 5 Drawing Sheets

MANAGEMENT OF MULTIPLE LINKS TO A FILE IN A FILE SYSTEM

TECHNICAL FIELD

This invention relates generally to the field of managing computer files and objects in a computer system, and more particularly relates to maintaining one master object attribute table in a file system having multiple directories linked to a file.

BACKGROUND OF THE INVENTION

A computer system can be considered as three major components: (1) the application programs, such as a spreadsheet or word processing or graphics presentation application, which are used by the user; (2) the operating system that transparently manages the application's interactions with other applications and the computer hardware; and (3) the computer hardware comprising the processor, the random access memories, the actual electronic components which manage the magnetic and/or optical bits. The operating system has a kernel which, inter alia, controls the execution of applications, processes, and/or objects by allowing their creation, termination or suspension, and communication; schedules processes/objects of the same or different applications on the hardware, allocates memory for those objects, administers free space, controls access to the objects, and retrieves objects and data for the user. The term object is used herein to at least include a named storage space having a set of characteristics that describes itself and, in some cases, includes data. More broadly, an object is anything that exists in and occupies space in storage and on which operations can be performed, for example, programs, files, libraries, directories, and folders.

FIG. 1 is an example of a hierarchical file system 10 as is known in the art. The basic building block of a hierarchical file system 10 is the directory or root object 12 which is the anchor for objects linked into the file system 10. Such an example of the root object may be the directory named/ "slash", which by convention may be an interior rotating memory component of the computer system. From the root object 12 there may be links to multiple child directory objects 14 and 16, each of which may be linked to other child objects 18 or to stream or record files 20. The hierarchy will terminate in an empty directory 26, a record file, or a stream file as is shown as 20 and 24 in FIG. 1. The ability to create and link a child directory into a parent directory is the means by which a hierarchical file system is built.

All file systems, whether or not hierarchically implemented, require the use of an Object Attribute Table (OAT). The OAT stores attribute information for each object linked into the file system. Attributes include information such as time stamps, the number of links, object size, owner identifier, object type, access permissions, etc. Many file systems, for instance that which is part of the UNIX operating system, implement a single OAT, called an inode list in UNIX, for the entire file system. The inode list maintains the state of the file system. Administrators specify the size of the inode list when configuring a file system. In UNIX, the internal representation of a file or object is an inode (a contraction of the term index node). The inode contains a description of the disk layout of the file data and other information, e.g., such as the file owner, access permissions, and access times. Every file has one inode but may have several names all of which map into the inode. When a process refers to a file by name, the kernel parses the file name along its hierarchical path one component at a time, checks that the process has permission to search the directories in the path, and eventually retrieves the inode for the file.

A file system that is based upon a system-wide OAT such as the inode list of UNIX has two inherent disadvantages. First, a bottleneck is created across the entire system whenever an entry is allocated or deallocated in the system-wide OAT. The bottleneck results from the required synchronization to ensure that multiple processes are not accessing or modifying the OAT at the same time. Without this synchronization the OAT becomes corrupted. Second, the entire file system is at risk of becoming damaged, and perhaps unrecoverable, if the memory component that contains the system-wide OAT experiences hardware failures.

Instead of a single system-wide OAT or inode list, a separate OAT can be used for each directory object within the file system. Each directory object owns or maintains an OAT that contains object attributes only for objects linked by that directory. When an object has multiple links to one or more directories, however, a new problem is created because there are multiple copies of the object attributes in one or more OATs. Thus, all the multiple copies of the attributes have to be updated whenever the object's attributes are changed, which in certain situations, degrades performance and jeopardizes the integrity of the file system.

There is thus a need in the industry to provide multiple OATs while at the same time maintaining a single copy of the object attributes across the entire file system even when an object has multiple links.

SUMMARY OF THE INVENTION

These needs and others that will become apparent to one skilled in the art are satisfied by a file system comprising a master object attribute table entry in a first directory object linked to a file and storing the attributes for the file; and at least one slave object attribute table entry in a second directory object linked to the file, the at least one slave object attribute table entry not storing the attributes for the file.

The first directory object may be one of a plurality of directory objects, and the slave object attribute table entry may be in another directory object or the same directory object as the master object attribute table entry.

The slave object attribute table entries link their respective directory(ies) to the file, and the master object attribute table entry points to those slave object attribute table entries linking to the file according to a protocol. The protocol may be unidirectional, bidirectional, or such that the master object attribute table entry and all slave object attribute table entries point to each other.

In the file system, the master object attribute table entry and all the slave object attribute table entries may be of comparable size to contain the same attribute information of the file.

Another aspect of the invention is a system to manage objects in a digital processing system, comprising a master entry in a object attribute table of a first directory object linked to a file and storing the attributes for the file; at least one placeholder entry having at least a space the same size as the master entry which may be in the object attribute table of the first directory object or another directory object, the placeholder entry also linked to the file and containing a pointer, the placeholder entry capable of but not storing the attributes for the file, and a pointer protocol in which a master pointer in the master entry and the placeholder pointer are aware of their respective addresses and the address of the linked file.

Yet another embodiment of the invention is a method for storing attributes of an object in a file system, comprising the steps of creating a master object attribute table entry in a first directory linking to an object and storing the attributes of the object in that entry, storing the address of the master object attribute table entry in the object header, and creating at least one slave object attribute table entry in a second directory linking to the object, the at least one slave object attribute table entry not having the attributes of the file but capable of storing the object's attributes.

The method above may further comprise initiating deallocation of the master directory object attribute table entry, finding a candidate object attribute table entry among the slave object attribute table entries according to a pointing protocol, qualifying the candidate object attribute table entry to be the new master object attribute table entry, copying the attributes of the file to the new master object attribute table entry, updating a header in the file to address the new master object attribute table entry, and updating a pointer in all the slave attribute table entries to maintain the pointing protocol.

Another aspect of the invention is a data storage medium capable of transferring a program of machine readable instructions executable by a computer to perform method steps to manage a file system, the method steps comprising: creating a second object attribute table entry in a directory in the file system and linking it to a file that has already been linked to a first object attribute table entry to the file, the first object attribute table entry having the attributes of the file, the second object attribute table entry having a placeholder capable of but not storing the attributes of the file; and updating the first object attribute table entry to include a pointer to the second object attribute table entry. The data storage medium may further comprise machine readable instructions to qualify the second object attribute table entry to receive the file's attributes; transfer the attributes of the file from the first object attribute table entry to the second object attribute table entry; deallocate the first object attribute table entry; update the file to address the second object attribute table entry; and update any subsequent object table entries also linked to the file to point to the second object attribute table entry as having the file's attributes.

The invention is also a file system in a computer system, comprising: a means to create a file having a plurality of attributes; a means to create a plurality of directories; a means to create a plurality of attribute table entries in each directory that is linked to the file; and a means to store the plurality of attributes in only one of the attribute table entries. The file system above may further comprise a means to deallocate the one attribute table entry in which the plurality of attributes are stored; a means to qualify another of the plurality of attribute table entries to store the plurality of attributes; a means to transfer the plurality of attributes to the qualified attribute table entry; a means to update the file to address the qualified attribute table entry having the file's attributes; and a means to update the pointers of the plurality of attribute table entries to indicate that the qualified attribute table entry has the file's attributes.

The invention is also a data processing system capable of executing objects and maintaining a file system, comprising: a processing unit connected to a memory apparatus; an operating system to manipulate and control access to files; a plurality of peripheral devices connected to the processing unit on a bus, the peripheral devices to provide input and output to the data processing system; a plurality of files used by the data processing system to process data; a user interface with which a user can manipulate the operating system to access files; an application program interface with which an application program can manipulate the operating system to access files; a plurality of directory objects, each containing at least an attribute table having a number of entries corresponding to the files linked to its respective directory object; a master entry in one of the plurality of directory objects containing the attributes of the file to which it is linked; and at least one slave entry in one of the plurality of directory objects capable of but not containing the attributes of the file to which it is linked, and containing a pointer to at least one other entry linked to the file.

BRIEF DESCRIPTION OF THE DRAWING

The novel features believed characteristic of the invention are set forth in the claims. The invention itself, however, as well as a preferred mode of use, objects and advantages thereof, will best be understood by reference to the following detailed description of an illustrative embodiment when read in conjunction with the accompanying Drawing, wherein:

DETAILED DESCRIPTION OF THE INVENTION

Figure 2:
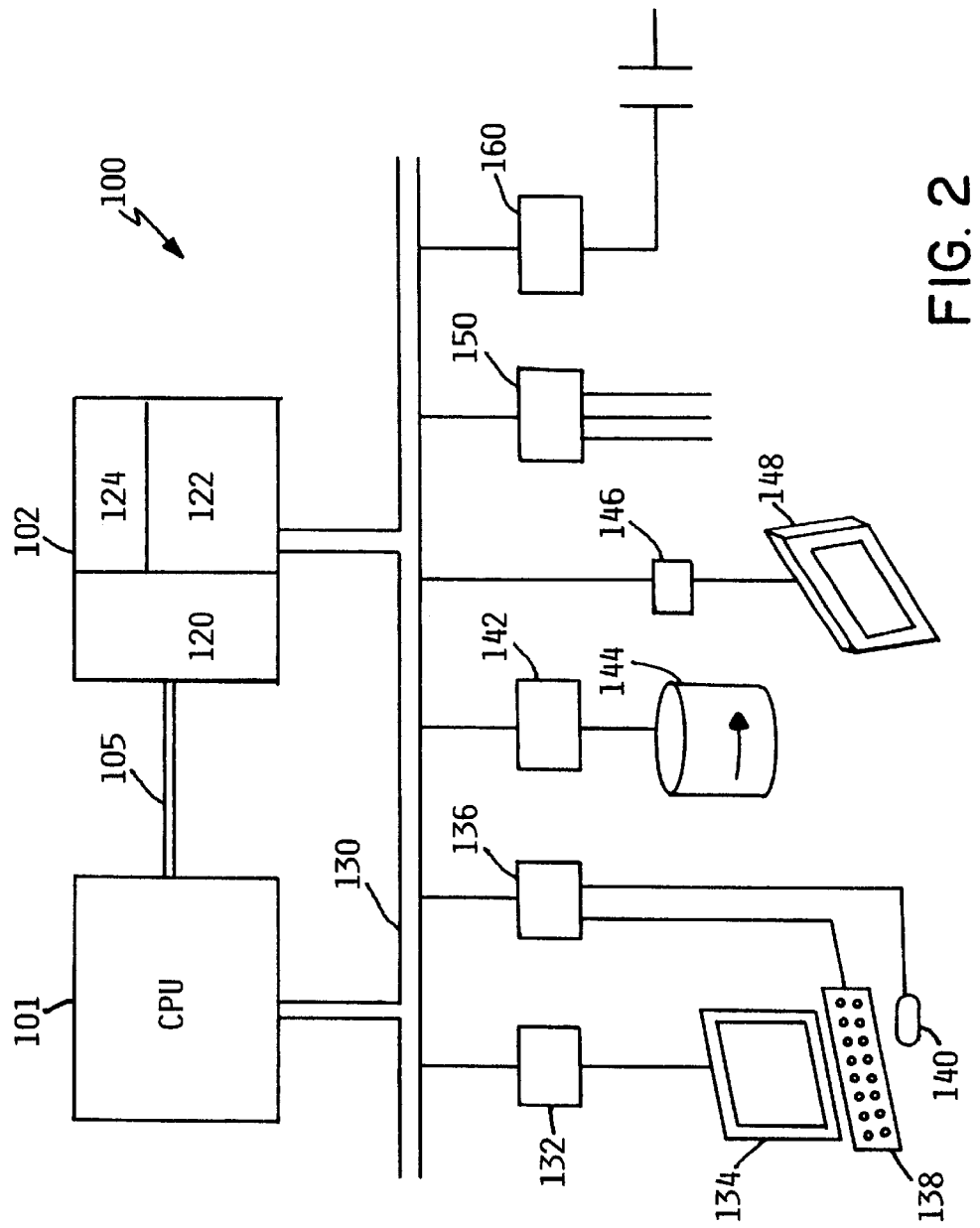
FIG. 2 is a high-level block diagram of a server computer system capable of implementing the preferred embodiment of the invention.

Referring to the Drawing, wherein like numbers denote like parts throughout the several views, FIG. 2 shows a high-level block diagram of a digital processing system 100 which may be a high-level computer system 100, consistent with an embodiment of the invention. Digital processing system 100 may comprise central processing unit (CPU) 101 which may be a programmable processor, executing instructions stored in memory 102. While a single CPU is shown in FIG. 2, it should be understood that computer systems having multiple CPUs could be used. Connected to the CPU 101 through an internal bus 105 and/or an external system bus 130 is memory 102. Memory 102 is a random-access semiconductor memory for storing data and programs; memory is shown conceptually as a single monolithic entity but it is well known that memory is often arranged in a hierarchy of caches and other memory devices. Memory 102 contains at least an operating system having a kernel 120, and applications 122. Kernel 120 provides, inter alia, functions such as device interfaces, management of memory pages, management of multiple tasks, etc. as is known in the art. CPU 101 is suitably programmed to execute the kernel 120 and instructions of applications 122 retrieved from memory 102. Memory 102 has the necessary elements to carry out the preferred embodiment by having object attribute tables as described below. Applications 122 may include a server software application, and if so, network interface 160 may interact with the server software application 122 to enable digital processing or computer system 100 to be a network server.

Communication bus 130 supports transfer of data, commands and other information between different devices; while shown in simplified form as a single bus, it may be structured as multiple buses, and may be arranged in a hierarchical form. Display adapter 132 supports video display 134 which may be a cathode-ray tube display, a flat panel display, or a touch panel, although other display technologies may be used. Keyboard/pointer adapter 136 supports keyboard 138 and pointing device 140 depicted as a mouse, it being understood that other forms of input devices could be used. Storage adapter 142 supports one or more data storage devices 144 which may be rotating magnetic hard disk drives or CD-ROM drives although other data storage devices could be used. Printer adapter 146 supports printer 148. Adapter 150 may connect a wide variety of devices to the digital processing or computer system 100 and to other adapters connected to other devices such as, but not limited to, speakers, audio and visual equipment, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Ultra3 SCSI, Infiniband, FDDI, ATM, 1394, ESCON, wireless relays, USB, Twinax, LAN connections, WAN connections, high performance graphics, etc., as is known in the art. Network interface 160 provides a physical interface to a network, such as the Internet. This interface may comprise a modem connected to a telephone line through which an Internet access provider or online service provider is reached, but increasingly other higher bandwidth interfaces are implemented. For example, digital processing or computer system 100 may be connected to another network server via a local area network using an Ethernet, Token Ring, or other protocol, the second network server in turn being connected to the Internet. Alternatively, network interface 160 may be provided through cable television, fiber optics, satellites, wireless, or other connections. The representation of FIG. 2 is intended as an exemplary simplified representation of a high-end server, it being understood that in other digital processing systems 100 many variations in system configuration are possible in addition to those mentioned here.

Finally, digital processing system 100 need not be a computer at all, but may be a simpler appliance-like client device, also called an embedded device, having less processing power and memory such as a network terminal, a thin client, a terminal-like device, a voice response unit, etc. The convergence of computing, telecommunications and consumer electronics is causing a tremendous growth in the number and variety of pervasive mobile devices as clients. This mobile architecture enables the multitude of clients including laptops, sub-notebooks, handheld computers such as personal digital assistants and companion devices, and mobile appliances such as smartphones, pagers, simple messaging devices and wearable devices. Thus when the digital processing system 100 is a mobile or an embedded device, the adapters 150 and network interfaces 160 support a variety of multi-modal interfaces including traditional keyboard and mouse interfaces, small text screens, pen, touch screens, speech recognition, text-to-speech and other emerging technologies like wearable devices. Such special-purpose devices for accessing the world wide web, such as an Internet access box for a television set, or a portable wireless web accessing device, which can implement an adapter for the purpose of communicating data to/from another computer system are also intended to be within the scope of a digital processing system 100.

As will be described in detail below, aspects of the preferred embodiment pertain to a specific method having steps implementable on a digital processing system 100. A file system of the computer is a logical grouping of the computer's files and is manipulated by the user by means of a user interface or a program by means of an application program interface. The digital processing system 100 herein is one which has sufficient machine functions to implement a user or program interface, and which can maintain directories of objects and attributes of those objects. The code to manipulate the OAT may be part of the kernel or other application. The OAT, its entries, the links, and pointers are all managed by code which interacts integrally with the operating system. In the sense used herein, the term operating system need not be an extensive operating system for a high end server but may also include a smaller operating system for appliance-like devices.

In an alternative embodiment, the capability to build and use master and slave Object Attribute Table Entries (OATEs) in which only one master OATE for an object's attributes is maintained in accordance with principles of the invention may be implemented as a computer program-product for use with the computer system 100. The programs defining the functions of the preferred embodiment can be delivered to the computer system 100 and/or to the peripheral device for installation on a connected adapter via a variety of signal-bearing media, which include, but are not limited to: (a) information permanently stored on non-writable storage media, e.g., read only memory devices within either computer such as CD-ROM disks readable by CD-ROM; (b) alterable information stored on writable storage media, e.g., floppy disks within a diskette drive or a hard-disk drive; or (c) information conveyed to a computer by a telephone or a cable media network, including wireless communications. Such signal-bearing media, when carrying instructions that may be read by an adapter or a computer to direct the functions of the present invention, represent alternative embodiments. In the alternative, the function of figures could be implemented by control circuitry through the use of logic gate, programmable logic devices, or other hardware components in lieu of a processor-based system.

Figure 1:
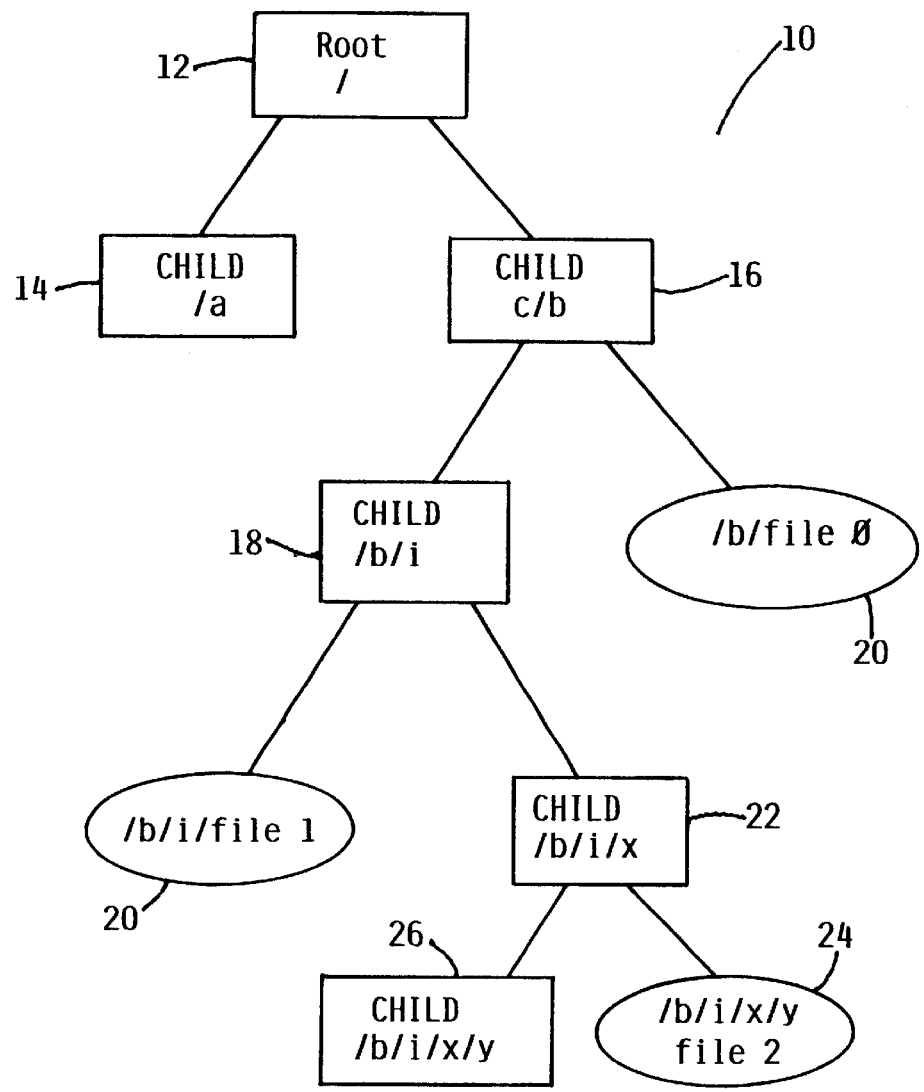
FIG. 1 is a block diagram of a conventional hierarchical file system.

As before, an object is an inclusive term intended to mean at least a named storage space with a set of characteristics that describe itself and, in some cases, includes data; and more broadly, an object is anything that exists in and occupies space in storage and on which operations can be performed, for example, programs, files, libraries, directories, and folders. The objects are logically arranged in a file system, a common example of which is shown as an hierarchical file system of FIG. 1. Other file systems not having a hierarchy, such as a flat file system having multiple directories all on one level or even a file system in which all the files are stored in one directory, may also take advantage of the invention so long as the file system may sustain multiple links to the same file. A file is an example of an object and henceforth the terms object and file will be used interchangeably; although it should be noted that an object may be much more than a file.

Figure 3:
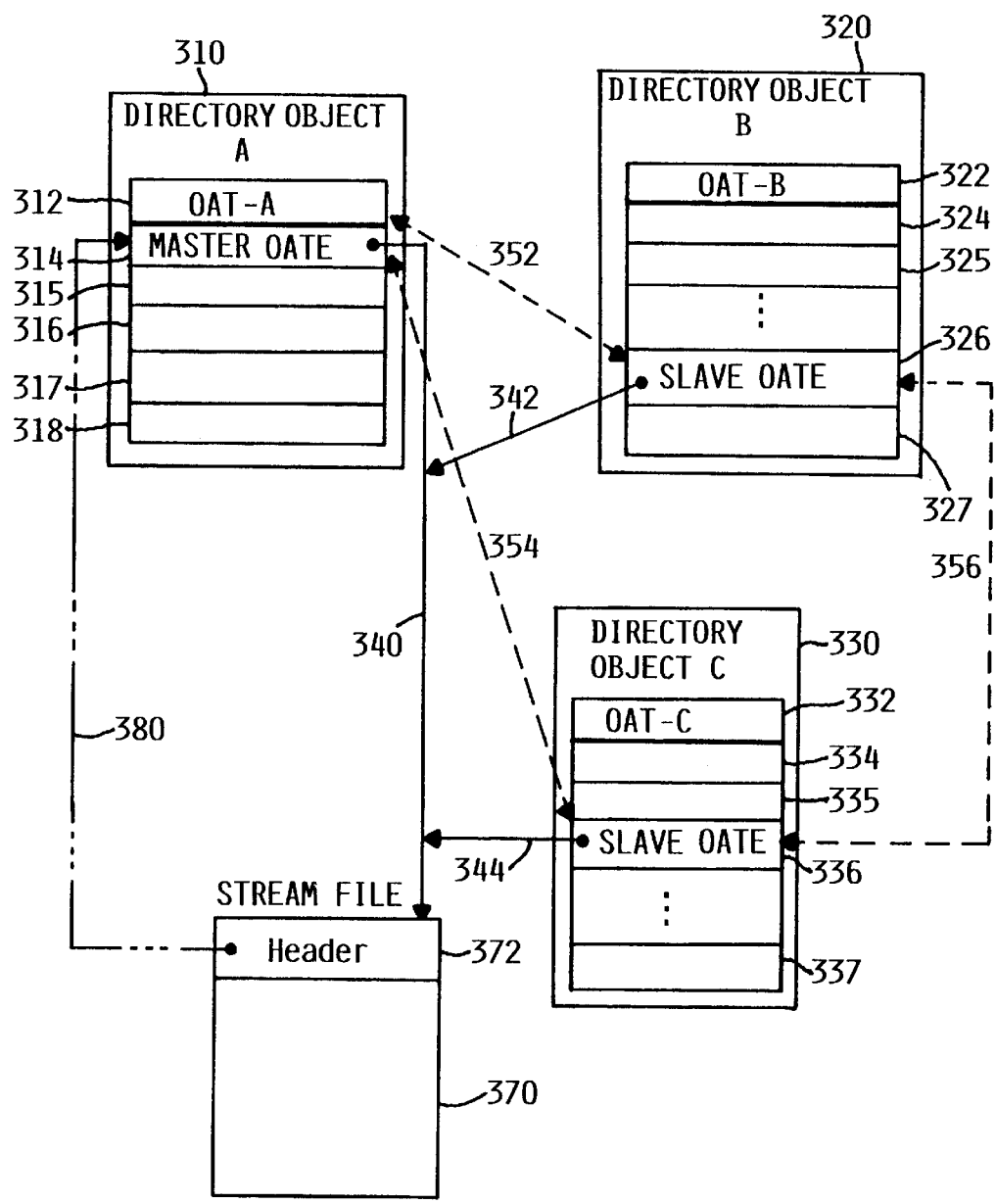
FIG. 3 is a simplified block diagram of a computer's file system having one file linked in multiple directory objects in accordance with principles of the invention.

Several of these objects may be configured as directory objects having an OAT, of which three are shown in FIG. 3 as directory or root objects. In contrast to file systems that maintain only one directory of file attributes, such as UNIX with its inode list, the computer file system of the invention may have multiple directory objects A 310, B 320, C 330, each of which contains its own OAT, as shown in FIG. 3, and each linked to the same file 370. The size of the directory objects, moreover, need not be identical, e.g. directory object A 310 need not be the same size as directory object B 320. Each directory object 310, 320, 330 has an object attribute table (OAT) 312, 322, 332, respectively, of the entries in that directory object. Within the OAT, there are a number of Object Attribute Table Entries (OATEs) 314, 315, . . . 318 corresponding to each file that is linked to that directory object 310. Each OATE is capable of holding the attributes for the linked file. An attribute is common information for all objects in the file system which further describes the object. Examples of attributes are time stamps, the number of links, object size, owner identifier, object type, access permissions, version of the object, etc. Although the number and type of attributes may vary between objects, it is preferable that the OATEs 314–318, 324–327, 334–337 be the same size across all the directory objects or at least a minimum size to be capable of storing the same amount of information, as will be discussed.

The invention is preferably embodied in a file system having multiple OATs, one for each directory, as shown in FIG. 3. An application program interface or a user through a user interface initiates the creation of a file. The operating system of the computer creates a stream or record file, links the stream or record file in a directory and names the file and/or directory. The operating system establishes a master OATE in the directory object that is the first directory to link to the file; thus, the directory object A 310 was the first directory to link to the stream file 370. An actual link 340, 342, 344 to the file is represented by a solid line from the directory objects 310, 320, 330 linked to the stream file 370. Although a stream file 370 is shown as being linked to each of the directory objects 310, 320, 330, the invention contemplates that any file or object type may be linked to an object directory. The address of the file 370 and all attributes of the file 370 are stored in the master OATE 314. The header 372 of the stream file contains, inter alia, the address of the master OATE 314 as represented by the dotted/dashed line 380.

When another directory object subsequently links to the same file, as initiated by the user or program interface, a slave OATE is established in the OAT of the new directory object, e.g., when directory object B 320 establishes a link 342 to the stream file 370, a slave OATE 326 is established in the OAT 322 of that directory object and/or when directory object C 330 establishes a link 344 to the stream file 370, another slave OATE 336 is established in the OAT 332. The slave OATEs 326, 336 are preferably the same physical size as the master OATE 314 and at least contain the address of the corresponding stream file 370. In accordance with features of the invention and unlike the prior art having multiple OATs replete with coherency problems of maintaining all attributes of the same file, the slave OATEs 326 and 336 do not actually contain any attributes of the file 370 but rather represent a place holder or reserved space of a size capable of holding the attributes within the master OATE 314. Only the master OATE 314 contains the attribute information associated with the file. When the stream file 370 is accessed such that the attributes and/or the address are modified, the operating system updates the master OATE 314.

The master OATE 314 points to all the slave OATEs 326, 336, as represented by the dotted lines 352, 354, 356 of FIG. 3 and the slave OATEs 326, 336 may or may not point to other slave OATEs. How one OATE determines the presence and location of another OATE is determined by a pointer protocol. The protocol may be unidirectional, meaning that master OATE 314 points to one slave OATE 326 which in turns points to the next slave OATE 336. Alternatively, the protocol may be bidirectional meaning that each OATE can point to all of the other OATEs, or only to its adjacent OATEs, regardless of whether it is a master or slave OATE, such as shown in FIG. 3. The protocol may be circular meaning that there is no end point. The master OATE 314 may contain all the pointers to all the other slave OATEs. There are a myriad of protocols of how one OATE can point to other OATEs, whether they are master or slave OATEs. One of skill in the art will understand the various protocols and their implementation.

Figure 4:
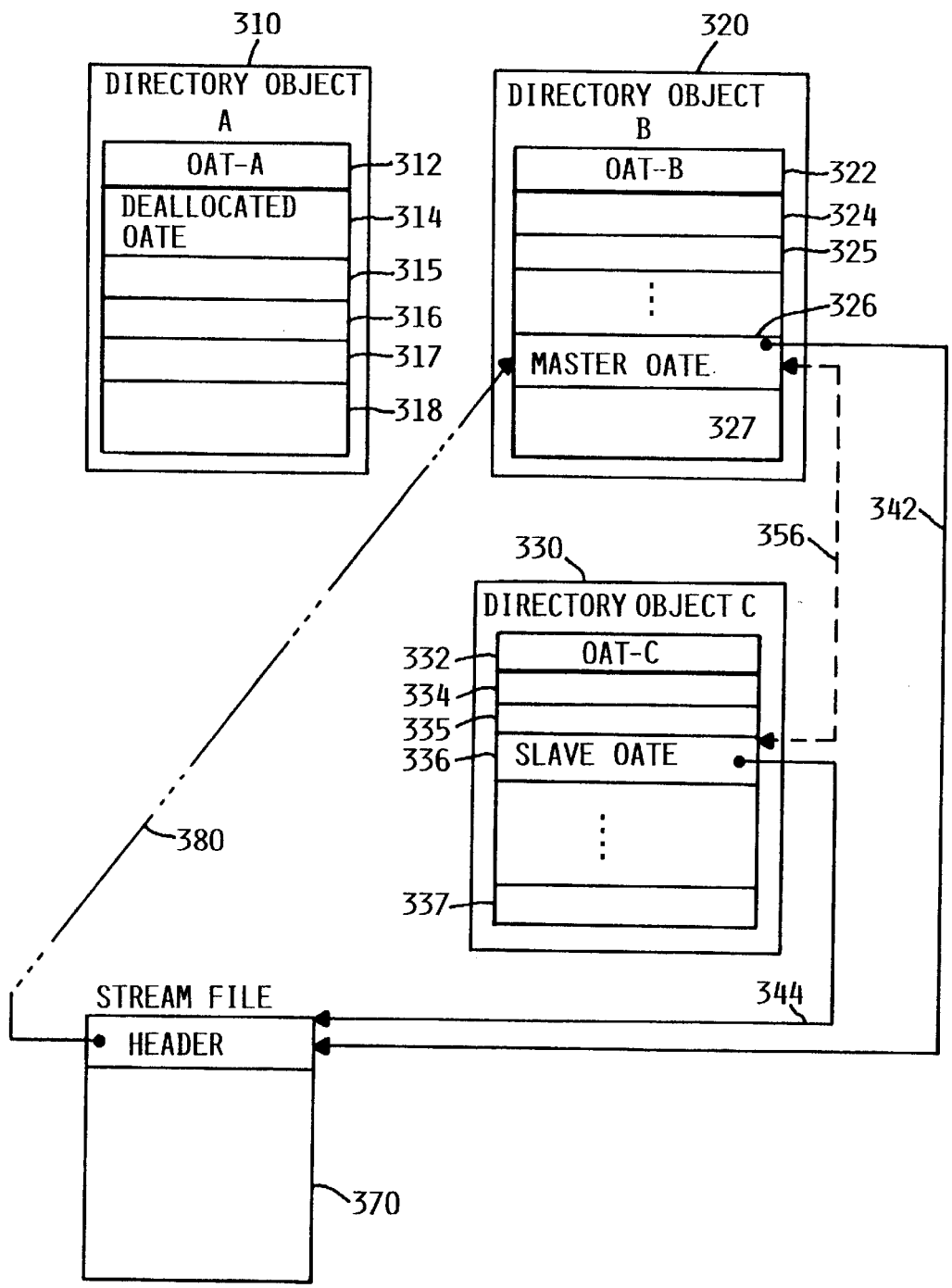
FIG. 4 is a simplified block diagram of a computer's file system in which one of the multiple links to a file is deallocated in accordance with principles of the invention. It is suggested that FIG. 4 be printed on the face of the patent.

FIG. 4 provides an illustration of the events that occur when an entry in a directory object is deallocated. Deallocation of a master or slave OATE may occur for several reasons, e.g., typically, a user wishes to remove an object, or move the object from one directory to another directory, delete the object or the directory, 310, etc. The object attributes cannot be deallocated or deleted because the stream file is still linked to other directory objects that use the stream file and may require that attribute information. In accordance with the preferred embodiment of the invention, the object attributes in the master OATE 314 are first copied to a slave OATE 326, thus explaining the preference that the entries to be the same size across all the directories, and the slave OATE 326 becomes the new master OATE for the stream file 370. The operating system further updates the stream file header 372 to point to the address for the new master OATE 326 and updates the pointers of all slave OATEs to point to the new master OATE, if required by the pointer protocol of how OATEs recognize other OATEs linked to the same file. The slave OATEs need not be further updated nor otherwise changed. After these events occur, the operating system deallocates the old master OATE 314 in the directory object A 310 and removes the link 340. As before, the new master OATE 326 still chains together the slave OATEs associated with the file 370 according to the pointer protocol.

Figure 5:
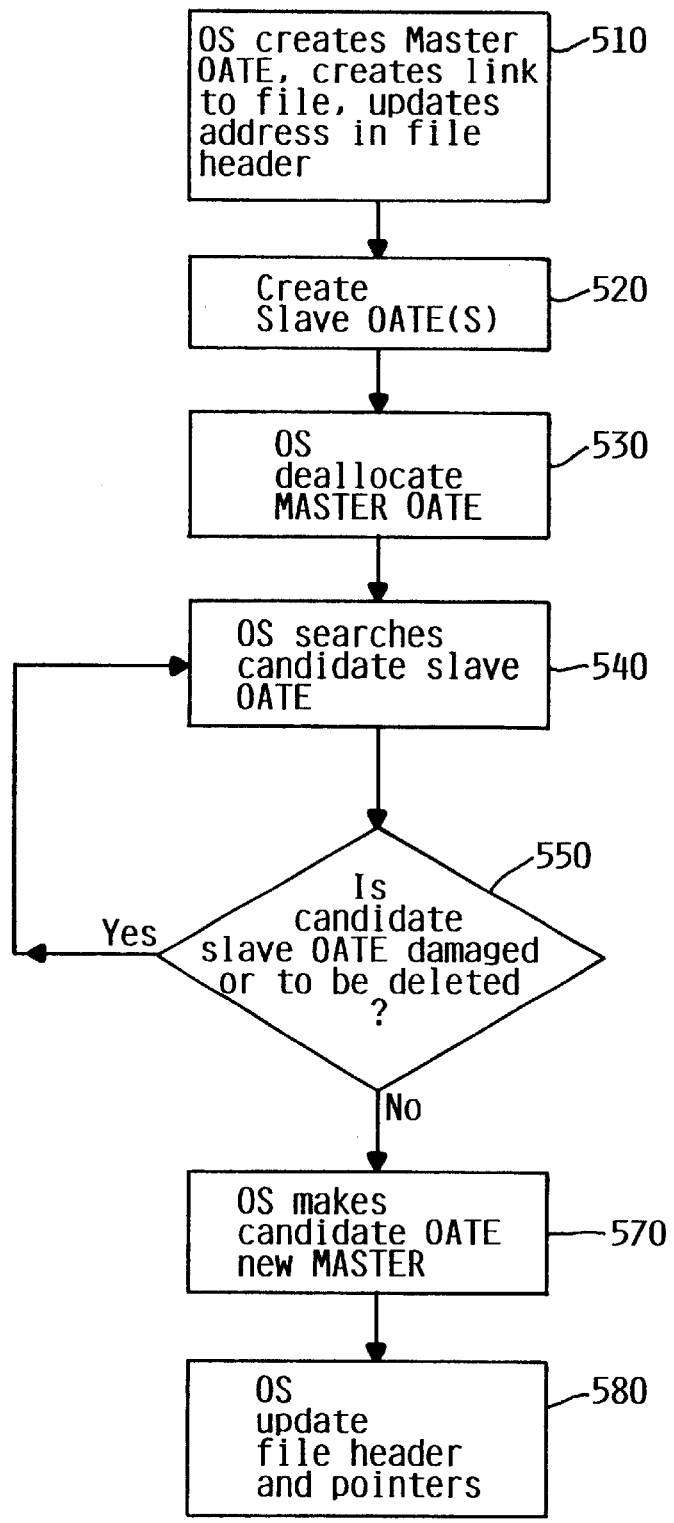
FIG. 5 is a simplified flow diagram of the process by which the attribute information of the file is transferred to an entry in another linked directory.

FIG. 5 is a simplified flow chart of how the invention changes a master OATE when it is to be deallocated. In block 510 a master OATE containing the address and the attributes and other information that may be pertinent is created by the operating system. A master OATE is created in the OAT of the first directory object linking the file. The header of the file is updated to address the master OATE. Now, a second directory object links to the file in block 520. Slave OATEs are established by the operating system in those directory objects with pointers to the header of the file. The user or program now decides to deallocate the master OATE in block 530, either from the same or other directory object depending on the user or program interface. Transparent to the user, the inventive process in block 540 then searches for a candidate slave OATE according to the pointer protocol described earlier. The candidate slave OATE is qualified to determine that it is not damaged and not in the process of being deleted, as in block 550. If the candidate slave OATE is qualified to become the next master OATE, then in step 570, the attributes are transferred to the candidate slave OATE which then becomes the new master OATE. In block 580, the header of the file is updated to contain the address of the new master OATE and, if required, the pointers of all other slave OATES are updated.

Thus, the benefits of the invention is that there is no bottleneck resulting from having to update a single OAT, such as the inode list of the UNIX system. Another benefit is that there is no need to update multiple copies of the file's attributes.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

What is claimed is:

1. A file system to manage objects in a digital processing system, comprising:
   (a) a master entry in an object attribute table of a first directory object, the master entry linked to a file and storing the attributes for the file; and
   (b) at least one placeholder entry having a size at least the same size as the master entry to contain the same attributes for the file, each placeholder entry located in an object attribute table of the first directory abject or another directory object, each placeholder entry containing a placeholder pointer, each placeholder entry linking its respective directory object to the file independent of the master entry, and each placeholder entry capable of but not storing the attributes for the file;
   (c) a pointer protocol in which a master pointer in the master entry is aware of the address of each placeholder entry and the address of the linked file, and the placeholder pointer in each placeholder entry is aware of the address of the master entry and the address of the linked file.

2. The file system of claim 1, further comprising a plurality of directory objects, one of which is the first directory object, and wherein at least one placeholder entry is in another of the plurality of directory objects other than the master entry.

3. The file system of claim 1, wherein the at least one placeholder entry is in the same directory object as the master entry.

4. The file system of claim 1, wherein the protocol is unidirectional.

5. The file system of claim 1, wherein the protocol is bidirectional.

6. The file system of claim 1, wherein the protocol is such that the master entry and all placeholder entries point to each other.

7. A method for storing attributes of an object in a file system, comprising:
   (a) creating a master object attribute table entry in a first directory linking to an object, the master object attribute table entry having a master pointer;
   (b) storing the attributes of the object in the master directory object attribute table entry;
   (c) storing the address of the master object attribute table entry in the object header;
   (d) creating at least one slave object attribute table entry at least the same size as the master object attribute table entry in the first or a second directory, the at least one slave object attribute table entry having a slave pointer linking to the object independent of the master object attribute table entry, the at least one slave object attribute table entry not having the attributes of the object but capable of storing the object's attributes; and
   (e) creating a pointing protocol in which the master pointer in the master object attribute table entry points to the address of the at least one slave object attribute table entry and the address of the object, and the slave pointer of the at least one slave object attribute table entry points to the address of the master object attribute table entry and to the address of the object.

8. The method of claim 7, further comprising:
   (a) initiating deallocation of the master directory object attribute table entry;
   (b) finding a candidate object attribute table entry among the at least one slave object attribute table entries according to the pointing protocol;
   (c) qualifying the candidate object attribute table entry to be the new master object attribute table entry;
   (d) copying the attributes of the object to the new master object attribute table entry;
   (e) updating a header in the object to address the new master object attribute table entry, and
   (f) updating the slave pointer in all of the at least one slave attribute table entries to maintain the pointing protocol.

9. A data storage medium capable of transferring a program of machine readable instructions executable by a computer to perform method steps to manage a file system, the method steps comprising:
   (a) creating a second object attribute table entry in a directory in the file system and independently linking it to a file that has already been linked to a first object attribute table entry to the file, the first object attribute table entry having the attributes of the file, the second abject attribute table entry created to be at least the same size of the first object attribute table entry to be capable of storing the attributes of the file, the second object attribute table entry in the same directory as the first object attribute table entry or in a second directory, the second object attribute table entry having a placeholder capable of but not storing the attributes of the file; and
   (b) updating the first object attribute table entry to include a pointer to the second object attribute table entry;
   (c) creating a second pointer in the second object attribute table entry to the address of the first object attribute table entry and, independent of the first object attribute table entry, to the address of the file; and
   (d) creating a pointer protocol whereby the pointer of the first object attribute table entry points to the second object attribute table entry and to the file, and the second pointer points to the first object attribute table entry and to the file.

10. The data storage medium of claim 9, further comprising the method steps of:
   (a) qualifying the second object attribute table entry to receive the file's attributes;
   (b) transferring the attributes of the file from the first object attribute table entry to the second object attribute table entry;
   (c) deallocating the first object attribute table entry;
   (d) updating the file to address the second object attribute table entry;
   (e) updating pointers in any subsequent object table entries also independently linked to the file to point to the second object attribute table entry as having the file's attributes.

11. A file system in a computer system, comprising:
   (a) means to create a file having a plurality of attributes;
   (b) means to create a plurality of directories;
   (c) means to create a plurality of attribute table entries in each directory linked to the file, each of the plurality of attribute table entries being at least of comparable size to store the plurality of attributes, each of the plurality of attribute table entries have a respective pointer;

(d) means to link each of the plurality of attribute table entries to the file independent of each of the other attribute table entries linked to the file; and (e) means to store the plurality of attributes in only one of the attribute table entries;

(f) means to implement a pointer protocol whereby the respective pointer in the one attribute table entry storing the plurality of attributes points to the file and to each of the plurality of attribute table entries not storing the attributes;

(g) means to implement the pointer protocol whereby each respective pointer of each of the plurality of attribute table entries not storing the plurality of attributes points to the file and to the one attribute table entry in which the plurality of attributes are stored;

(h) means to deallocate the one attribute table entry in which the plurality of attributes are stored;

(i) means to qualify another of the plurality of attribute table entries to store the plurality of attributes;

(j) means to transfer the plurality of attributes to the qualified attribute table entry;

(k) means to update the file to address the qualified attribute table entry having the file's attributes; and (l) means to update the pointers of the plurality of attribute table entries to indicate that the qualified attribute table entry has the file's attributes.

* * * * *

UNITED STATES PATENT AND TRADEMARK OFFICE
CERTIFICATE OF CORRECTION

PATENT NO. : 6,785,693 B2  
DATED : August 31, 2004  
INVENTOR(S) : Dennis Steven DeLorme et al.

Page 1 of 1

It is certified that error appears in the above-identified patent and that said Letters Patent is hereby corrected as shown below:

Column 9,
Line 18, "abject" should be -- object --.

Signed and Sealed this

Twenty-second Day of March, 2005

JON W. DUDAS
*Director of the United States Patent and Trademark Office*